United States Patent [19]

Sonderegger et al.

[11] Patent Number: 5,265,481
[45] Date of Patent: Nov. 30, 1993

[54] FORCE SENSOR SYSTEMS ESPECIALLY FOR DETERMINING DYNAMICALLY THE AXLE LOAD, SPEED, WHEELBASE AND GROSS WEIGHT OF VEHICLES

[75] Inventors: Hans C. Sonderegger; Reto Calderara, both of Neftenbach; Mario Giorgetta, Winterthur; Dario Barberis, Niederhasli; Markus Caprez, Zürich, all of Switzerland

[73] Assignee: Kistler Instrumente AG, Winterthur, Switzerland

[21] Appl. No.: 995,831

[22] Filed: Dec. 23, 1992

Related U.S. Application Data

[63] Continuation of Ser. No. 810,039, Dec. 19, 1991.

[30] Foreign Application Priority Data

Dec. 19, 1990 [CH] Switzerland ............ 04024/90

[51] Int. Cl.[5] .................................................. G01L 1/16
[52] U.S. Cl. ........................... 73/862.625; 340/666; 340/933; 177/210 C
[58] Field of Search ............. 73/146.2, 146.3, 146.4, 73/146.5, DIG. 4, 862.473, 862.625; 177/134, 211; 340/442, 665, 666

[56] References Cited

U.S. PATENT DOCUMENTS

| | | | |
|---|---|---|---|
| 3,940,974 | 3/1976 | Taylor | 73/DIG. 4 |
| 4,356,423 | 10/1982 | Gudzin | 340/665 |
| 4,793,429 | 12/1988 | Bratton et al. | 177/210 C |
| 5,002,141 | 3/1991 | Lashbough et al. | 73/1 B |

Primary Examiner—Donald O. Woodiel
Assistant Examiner—R. L. Biegel
Attorney, Agent, or Firm—Barnes & Thornburg

[57] ABSTRACT

The invention comprises a force measuring system for the dynamic determination especially of axle loads, speed, vehicle wheelbase and gross weight. The force measuring system is laid permanently in the roadway. It is of modular assembly, consisting of the amplifier (11), sensor (12) and terminal module (13). The individual modules may be coupled tightly by plug-and-socket connections, welding flanges or glued flanges. The sensor module (12) consists of a hollow section (1), in which piezo-elements (4) are fitted under elastic preload. The piezo-elements (4) are accommodated in the hollow section (1) at intervals of typically 5 to 10 cm, and they may be connected all together with only one electrically conductive foil (5) to the signal processing facility (19), or groupwise or even singly. According to this subdivision the road width can be sectioned as desired, in order to obtain a road loading diagram for instance. The hollow section is designed so that it can be opened elastically by lateral clamping, to allow mechanically interconnected piezo-elements (4) to be inserted. After releasing this clamping, the piezo-elements (4) are under high elastic preload. In this way any tolerance errors can be overcome, so that costly machining operations are unnecessary and all parts with standard tolerances can be used.

12 Claims, 4 Drawing Sheets

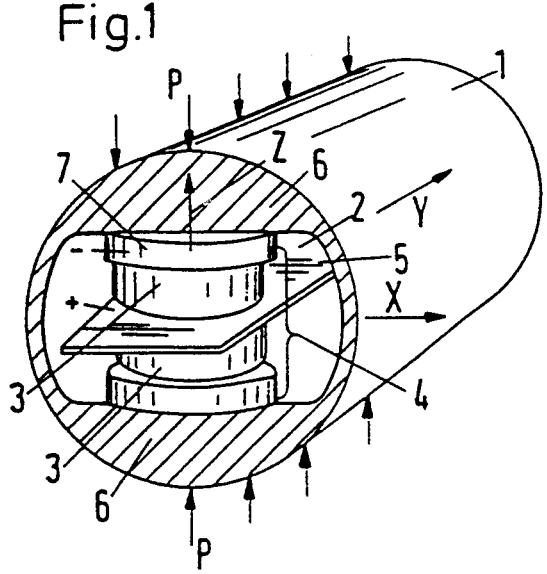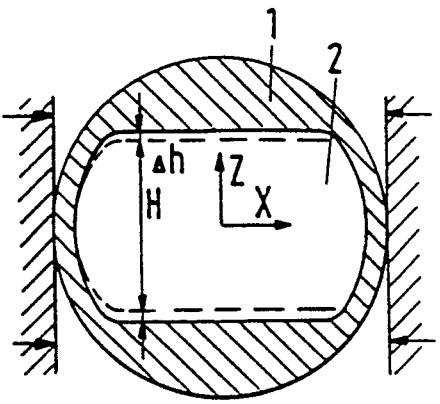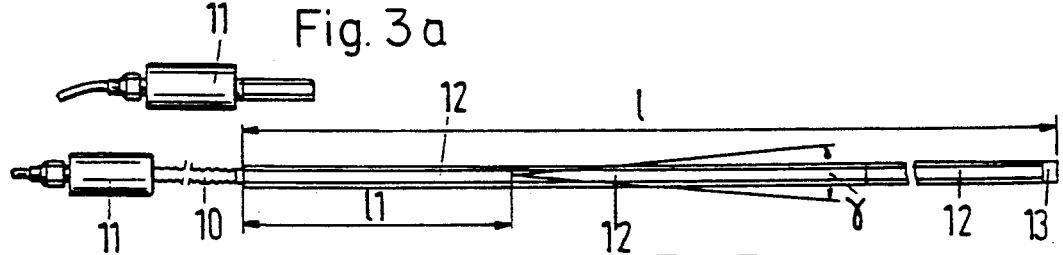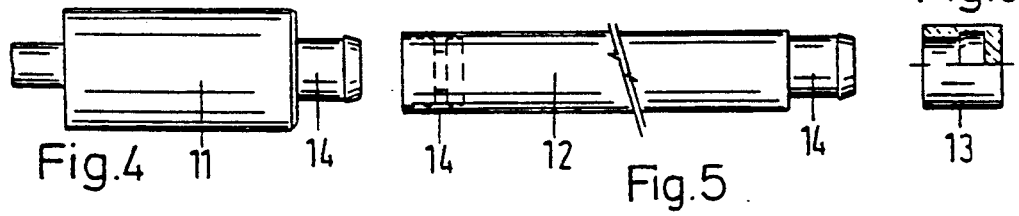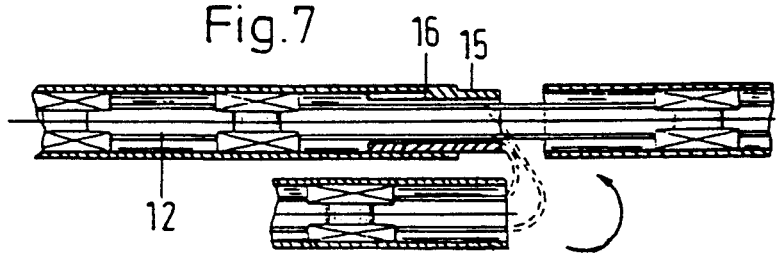

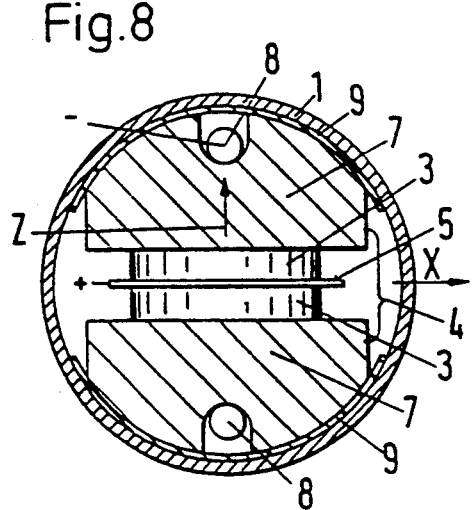
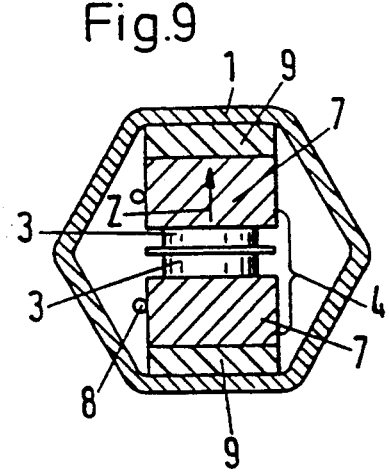
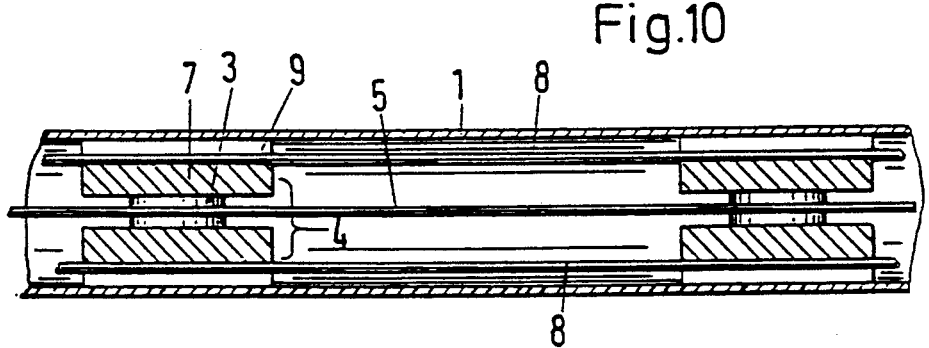
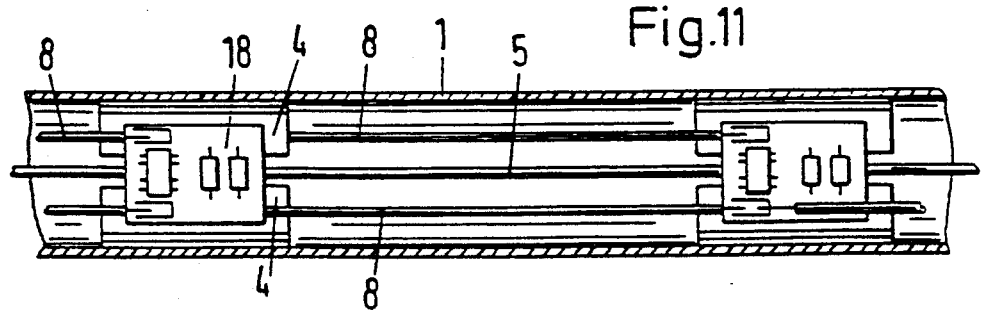
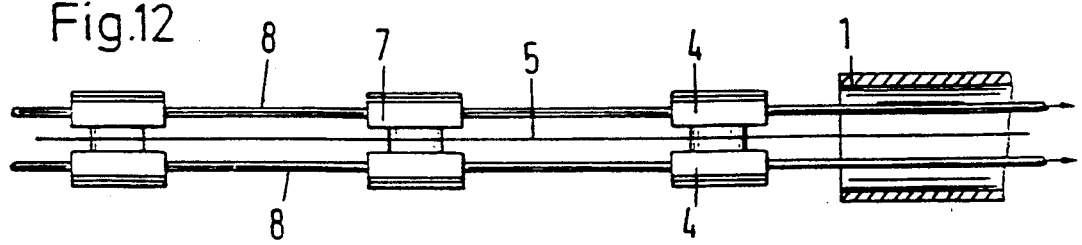

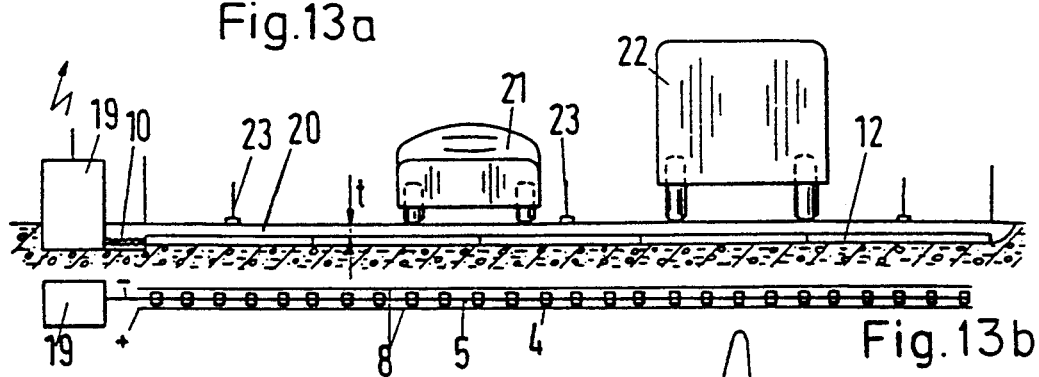
Fig.13a
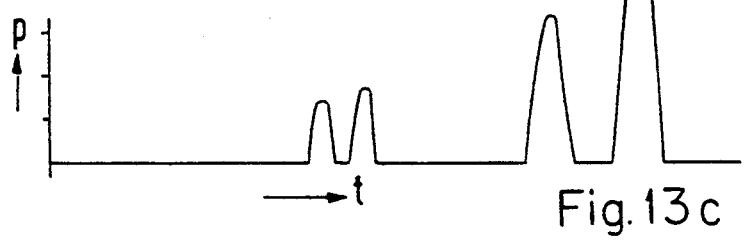
Fig.13b
Fig.13c
Fig.14a
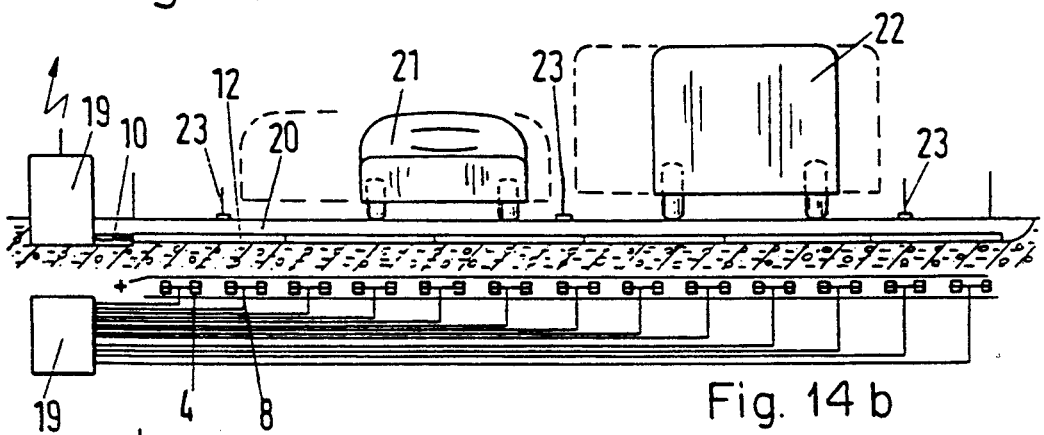
Fig.14b
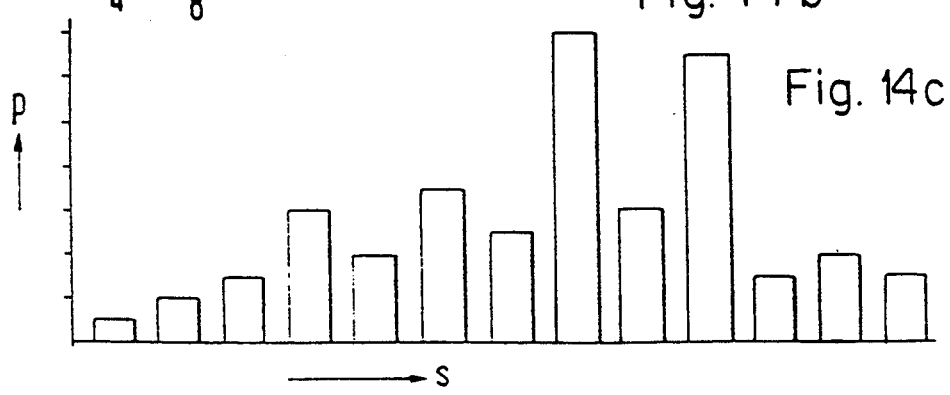
Fig.14c

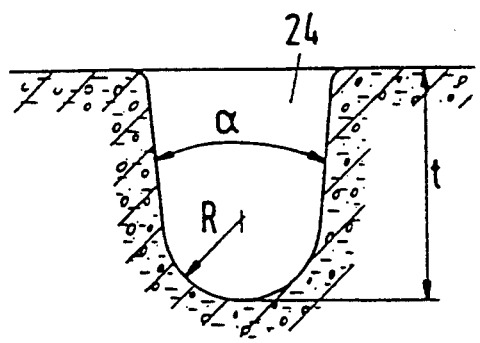
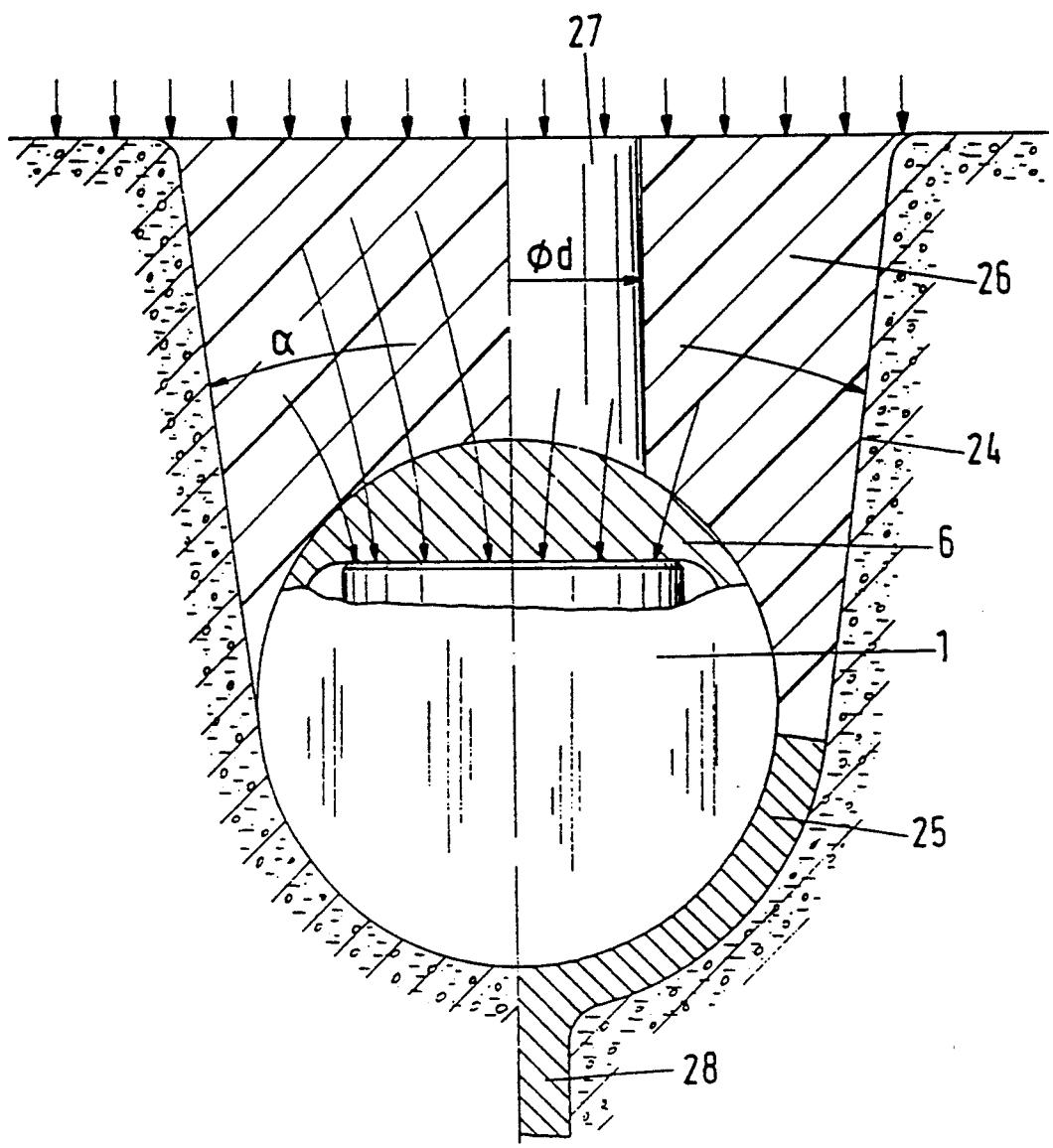

FORCE SENSOR SYSTEMS ESPECIALLY FOR DETERMINING DYNAMICALLY THE AXLE LOAD, SPEED, WHEELBASE AND GROSS WEIGHT OF VEHICLES

This is a continuation of application Ser. No. 07/810,039, filed Dec. 19, 1991.

The invention relates to a force sensor system, especially for determining dynamically the axle load, speed, wheelbase and gross weight of vehicles, and procedures for installing the force sensor, evaluating its signals and calibrating it.

Familiar is the static weight measuring of vehicles by means of weighbridges, or with weighing devices placeable on the roadway surface and generally easily transportable. One example of these is Swiss Patent CH 597 595, which describes a weighing platform having a weighing plate resting on a base plate through hydraulic transducers. The pressure of the liquid compressed by the loading is measured. Weighing platforms operating with strain gauge elements are known also. Thus the weighing platform described in U.S. Pat. No. 3,949,822 consists of a base plate flexible under load and a weighing plate, whereby the flexure is measured by means of strain gauges. Both weighing platforms are relatively thick and provided with ramps for driving up. Obviously they are suited only for static weighing of axle loads, or with the vehicle moving over very slowly.

In view of the growing vehicular traffic, however, a modern axle load determination must be capable of being performed dynamically, i.e. without the vehicle having to reduce its speed. Already attempts have been made to determine axle load and vehicle weight by means of so-called piezo-cables let into the top surfacing of a roadway. As signal elements, piezo-cables contain piezo-foils or piezo-compound. The measuring sensitivity of these depends very much on temperature. A measuring arrangement with a piezo-cable laid in the top surfacing is prone to instability owing to the small force-absorbing surface and the compressibility of a plastic cable, which causes varying measuring sensitivity and other measuring inadequacies, such as instability of the measuring zero. Moreover the measuring results of the axle load and vehicle weight are too inaccurate, mostly due to the often unsatisfactory insulation resistance of piezo-cables. The object of the present invention is to provide a force measuring system which overcomes the disadvantages named and enables dynamic determination of the axle load, speed, wheelbase and gross weight, employing advantageously two force sensor systems successively spaced at a short interval.

The force sensor system must be suitable for any width of roadway and installable in simple fashion, for asphalt as for concrete roads.

The problem is solved by laying in the roadway a force sensor consisting of a hollow section (1) in which a number of piezo-elements are fitted, giving a constant force measuring sensitivity over the entire length of the hollow section (1) and arranged to allow electrical connection of the piezo-elements in series, groupwise or individually, and so that simply layable modules result, assembled from amplifier, sensor and termination units.

The invention is described below in more detail, presenting various embodiments by means of drawings, viz.:

FIG. 1 Cross section through a force sensor according to the invention with cylindrical hollow section (tubular sensor).

FIG. 2 Installation procedure by opening a hollow section of circular cross section by lateral clamping.

FIG. 3A Amplifier module connected straight to the force sensor.

FIG. 3B Amplifier module connected separately by corrugated tubing, linked with force sensor.

FIG. 4 Amplifier module.

FIG. 5 Sensor module with plug-and-socket connection.

FIG. 6 Measuring terminal module with plug-and-socket connection.

FIG. 7 Sensor modules folded ready for transportation.

FIG. 8 Cross section through a tubular hollow profile with force transmitting parts insulated electrically from the tube.

FIG. 9 Cross section through a hexagonal hollow section.

FIG. 10 Longitudinal section through a tubular sensor according to FIG. 8.

FIG. 11 Longitudinal section through a tubular sensor fitted with preamplifiers.

FIG. 12 A preferred assembling procedure with an assembly unit consisting of conductive foil, piezo-disks fixed on both sides, force-introducing parts and signal conductors led into the opened hollow section.

FIGS. 13a, b, c Measuring arrangement for detecting vehicles.

FIGS. 14a, b, c, Measuring arrangement for determining the road loading profile.

FIG. 15 Cross section through a recess in the top surfacing of a roadway.

FIG. 16 Cross section through a recess according to FIG. 15, with inlaid force sensor and force introduction shown schematically.

FIG. 1 shows a perspective view with cross section through a force sensor according to the invention with cylindrical hollow section (tubular sensor). The hollow section 1 contains a recess 2 in its longitudinal axis, into which a piezo-element 4 is press-fitted, whereby 7 are the force-in transmitting parts for the two piezo-disks 3. Between them is an electrically conductive foil 5 as signal carrier. The resulting piezo-element 4 is designed to be sensitive essentially to a force acting in the z direction. This force P is introduced via a force-transmitting part 7. As is explained later, the force sensor lies generally in the top surfacing of a roadway and the forces P originate from the weight of a vehicle passing over it. In the electrically conductive foil 5 they generate positive electrical charges for example, in the force-transmitting parts 7 negative charges. The force-transmitting parts 7 may take the shape of insulating ceramic strips passing through the entire hollow section, or individual parts. Where the force-introducing-parts 7 are of ceramic, metallized parts must be provided according to the state of the art, so that the negative charges can be led off.

However it is also possible to make the force-transmitting parts 7 of metal, and lead off the negative charges directly via a metal hollow section.

Nevertheless it is safer to use the hollow section only for packing and force introduction, instead of making it serve as an electrical lead as well.

The piezo-element 4 is mechanically preloaded. This preloading is obtained by pressing the hollow section 1 together laterally in the x direction during assembly, with pressing clamps, so that the recess 2 widens in the z direction by the amount $\Delta h$ (FIG. 2), after which the piezo-element 4 is guided into the recess 2. After removing the lateral pressure the widening disappears also, and with suitable dimensioning of the hollow section 1 and the recess 2 the piezo-element sustains an elastic preload (FIG. 2). As materials for the piezo-disks 3 both crystalline materials and piezo-ceramics or piezo-foils may be employed. The hollow section 1 may for example consist of a stainless steel tube with drawn inside profile, or of an extruded tube of aluminium alloy. It might just as well consist of a suitable plastic. An outside diameter of about 20 to 30 mm has proved efficacious for installation purposes.

FIG. 3 shows a force sensor system according to the invention. FIG. 3A shows how the amplifier module 11 is attached directly to the force sensor of length, 1. FIG. 3B shows this connection in the form of a corrugated tubing cable 10. The force sensor of length 1 (which may be up to 20 m) is divided into separate pieces of length $l_1$ for manufacturing and installation reasons. These sensor modules 12 are preferably about 1 to 2 m long and can be plugged together, welded or glued. To match the force sensor to the roadway geometry it is advisable to provide the coupling elements with a certain elasticity, so that angle $\gamma$ is about 1° to 3°.

FIG. 4 shows a tubular-shaped amplifier module 11 with coupling piece 14.

FIG. 5 shows a sensor module 12 with positive and negative coupling pieces 14.

FIG. 6 shows the terminal module 13, which constitutes the termination of a force sensor system according to the invention. Its modular assembly comprising three different parts is fundamentally equal to all installation demands.

Obviously the coupling pieces 14 must perform mechanical as well as electrical functions.

In FIG. 7 it is indicated that a number of sensor modules 12 can be prepared for transportation in bellows fashion, to be subsequently fitted into each other for laying. Simple connecting flanges 15 may be provided for this, for welding or cementing together.

A sealing compound can be introduced through the injection opening 16.

FIG. 8 shows a cross section through an embodiment of the force sensor according to the invention similar to that in FIG. 1. The principal difference from the embodiment in FIG. 1 is the commercially obtainable tube, in that the force is introduced through separate force-transmitting parts 7, i.e. isolated from the hollow section 1 by an insulating layer 9. This makes it possible to keep both signal leads from the hollow section 1 separate, so that the measuring system is less susceptible to interference. The signals are led out on the one hand by the conductive foil 5, and on the other hand by the signal conductors 8, which are laid electrically conductive in grooves of the force-introducing parts 7. Mechanically too the embodiment of the force sensor shown in FIG. 2 constitutes a variant of FIG. 1, in that the hollow section 1 consists of a tube and can likewise be deformed elastically by lateral clamping in a special vice.

FIG. 9 shows a hollow section according to the invention, in the form of a hexagonal tube which can likewise be opened mechanically by clamping in the x direction. Other hollow sections are also conceivable.

FIG. 10 shows a force sensor according to FIG. 8 in longitudinal section, with the piezo-elements 4 arranged at short intervals, the signal conductors 8 and the electrically conductive foil 5.

In the embodiments of the invention shown previously the electronic components integrated in the force sensor were accomodated in the amplifier module 11. These components are usually charge amplifiers or impedance converters. Integrated impedance converters no longer necessitate high resistance in the connected cables. Now it may be desirable, as described below in the description to FIG. 14 in more detail, for individual piezo-elements 4 to be connected electrically by paralleling, with the measuring signals from the group of piezo-elements led out separately, i.e. to a signal processing facility 19 as shown in FIG. 14. The preamplifiers, of which at least one is provided for each group, can then be placed in the hollow section 1 for example, as shown in FIG. 11. In the embodiment shown in FIG. 11 the preamplifier 18 is attached to the sides of the electrically insulating piezo-elements 4, connected electrically with the conductive foil 5 on the one hand and with one of the signal conductors 8 insulated electrically from each other on the other hand. The two other signal conductors 8 shown lead off the measuring signals originating from other piezo-elements 4 or groups of piezo-elements 4.

It is advantageous to have the signal conductors 8, preamplifiers 18 and any other electrical components inside the hollow section 1, because they are then protected against extraneous corrosive influences and shielded electrically.

Leading the measuring signals away separately has the further advantage that the entire force sensor is not put out of action if one signal line is interrupted, but only one single piezo-element 4 or group of piezo-elements 4. With series connection the entire force sensor may be rendered inoperative under circumstances. Moreover every preamplifier enables the local measuring sensitivity of the associated piezo-element or piezo-elements 9 to be adjusted and therefore calibrated.

FIG. 12 shows a simple assembling procedure for the force sensor according to the invention. The conductive foil 5, the piezo-disks 3 glued pairwise on each side, the force-transmitting parts 7 and the signal conductors 8 form a preassembled unit similar to a chain 1 to 2 m long.

The hollow section 1 (in this case a tube) is expanded by pressing laterally in the z direction, analogous to the procedure shown in FIG. 2, providing sufficient free space to introduce the above-mentioned assembly unit into the tube. When the lateral pressure is removed, the tube draws together again so that the assembly unit with the piezo-elements 4 is placed under elastic preload. The previous embodiments shown in the figures display circular cross sections of the hollow section, though square, rectangular, hexagonal and other cross sections are possible.

FIG. 13 shows a measuring arrangement using the force sensor system according to the invention to detect axles travelling over the tubular sensor.

FIG. 13a shows the cross section through a two-lane roadway. The sensor modules 12 are bedded in the top surfacing 20 at a certain depth 't' and connected to the signal processing facility 19 by means of currugated tubing cables 10.

To detect the speed of a vehicle, two such force sensor systems are arranged at a certain distance of typically 10 m.

FIG. 13b shows the circuitry of the piezo-elements 4 arranged in the force sensor system. All of them are connected in series, so that only the electrically conductive foil 5 and the signal conductors 8 lead to the preamplifier of the signal processing facility 19.

FIG. 13c shows the recorded signals when a car 21 and shortly afterwards a goods vehicle 22 drive over the force sensor system.

In a computer the measured pulses can be converted by means of algorithms straight into axle load values. With two installations arranged in succession, the pulse rises can be used directly to measure the speed.

The limitation of the system is apparent when two vehicles pass the force measuring system at exactly the same time. For such cases it is advisable to connect the piezo-elements 4 of the overtaking lane to the signal processing facility 19 separated from those of the main traffic lane. This is quite possible.

FIG. 14 shows an extreme case with individual resolution of the sensitivity over the whole length of the force sensor system according to the invention.

FIG. 14a shows the cross section through a two-lane roadway as in FIG. 13a.

FIG. 14b shows the circuitry of the piezo-elements 4 arranged in the force sensor system. Here pairs of piezo-elements 4 are connected by separate signal conductors 8 with the signal processing facility 19. Even more extreme would be to connect every single piezo-element 4 with the signal processing facility. As shown in FIG. 14c, this opens up entirely new possibilities by dividing the roadway width into dozens of individual sections.

FIG. 14c shows a road loading diagram integrated for a whole day. This enables road surfacing research to acquire very important information concerning the loading state of individual road sections.

FIG. 15 shows the dimensions of a cutting profile, as is provided in a concrete roadway for example. The optimized empirical values: angle $\alpha$, ground radius R and depth t, have been gathered from extensive test series.

FIG. 16 shows the installation in cross section. The force sensor 1 may lie straight in the surfacing as in the left-hand half of the figure, or be laid in the rail 25 as in the right-hand half. The rail 25 is in turn anchored securely in the roadway by means of supporting pins 28. Particularly important are the opening angle $\alpha$ and the bond between the filling 26 and the side walls. It may be advisable to supplement the force-transmitting part 6 with force-transmitting parts 27, attached to the tubular section in pin or strip form. Comprehensive trials are still in progress concerning this. Also highly important is the composition of the filling compound 26, depending on whether an asphalt or a concrete roadway is to be equipped. By admixing plastic ingredients the filling can be optimized on the basis of test series. The object is to install a force sensor system according to the invention that will perform reliably for years.

It is not proposed to enlarge here upon the electronic evaluation systems for detecting the axle loads, vehicle speed and wheelbases, for identifying the vehicle types and cataloging them. The technical literature already contains a great deal of knowledge about traffic management systems. Till now, these systems have been based mostly on induction coils laid in the roadway surface. Some of them have been supplemented with piezo-cable sensors.

Hitherto, however, reliable traffic management systems have not proved possible, because no reliable axle load sensors were available.

The force sensor system according to the invention thus meets a commercial need with a solid-state sensor system whose deformation under maximum load lies in the region of a few micrometers, with a sensitivity ranging from a motorcycle to a 40-tonne goods vehicle.

Piezoelectric metrology is ideal for registering highly dynamic processes. It also possesses the highest resolution of all known measuring systems. By virtue of the simple signal lead-out with only one conductor, it is quite possible to link dozens of individual piezo-elements separately to the signal processing facility 19.

Decisively important furthermore is the fact that the piezo-elements generate the measuring energy themselves, which is converted under high voltage in the signal processing facility 19. With piezo-elements there is no heating of the force sensor system, as would be the case if the elements were fitted with strain gauges for example, so that the force measuring system according to the invention is always at the temperature of its environment, and boundary layer problems are avoided.

The use of piezoelectric preamplifiers has been known 15 years now. By employing solid-state technology they can be miniaturized down to a few cubic millimeters.

Hybrid charge amplifiers are fully equal to the temperatures and shocks of road traffic. They make possible constant sensitivity of the piezo-elements 4 regardless of the number of these connected.

The force sensor system according to the invention thus opens up a number of possibilities, which may assume importance both in the control of the increasingly complicated traffic tasks and in the status monitoring of highly stressed roadways on bridges, in tunnels etc.

Employed in a wider link-up, the system according to the invention enables transport flow directions to be registered statistically, leading to complete overviews of international road transport routes.

Finally the system is capable of segregating overloaded vehicles from the traffic stream.

It can be assumed that reliable weight recordings can be obtained at vehicle speeds from 5 to 200 km/h.

Another interesting application for the system according to the invention will be registering the movement of goods within factory premises and movements on airport runways.

We claim:

1. Force sensor system for dynamically determining vehicle axle load, speed, wheelbase and gross weight, comprising:
    a hollow section within a roadway and including one or more sensor modules connected in series;
    one or more piezo-elements located within each sensor module for measuring a load over the whole length of the hollow section;
    a terminating module attached to one end of said hollow section and an amplifier module attached to the other end of said hollow section; and
    said piezo-elements being electrically connected to said amplifier module.

2. The force sensor system according to claim 1, wherein the hollow section has a longitudinal recess, in which piezo-elements are press-fitted by force transmitting parts so that they are under permanent elastic preload.

3. The force sensor system according to claim 1, wherein the hollow section is a tube of circular cross section in which piezo-disks are fitted between force-transmitting elements so that they are under permanent elastic preload.

4. The force sensor system according to claim 1, wherein the hollow section is a tube of non-circular cross section in which piezo-disks are fitted between force-transmitting segments so that they are under permanent elastic preload.

5. A force sensor system according to claim 3, wherein the hollow section is placed under mechanical compression in a cross-sectional direction, so that a corresponding elastic enlargement ($\Delta h$) occurs in a cross-section at right angles to the mechanical compression for enabling the piezo-elements to be fitted into the hollow section.

6. A force sensor system according to claim 3, wherein the force transmitting elements are electrically insulated from the hollow section.

7. A force sensor system according to claim 1, wherein the individual modules are linked by any one of pluggable connectors, welding flanges and gluing flanges.

8. A force sensor according to claim 7, wherein any one of connectors and flanges is filled with plastic after connection.

9. A force sensor system according to claim 7, wherein the hollow section sensor being foldable in sections which can be unfolded and joined together at the roadway construction site; and
wherein a certain elasticity of any one of the connectors and flanges is provided in order to adapt the sensor to different roadway conditions.

10. A force sensor system according to claim 1, wherein the piezo-elements are connected with preamplifiers.

11. The force sensor system according to claim 1, wherein said sensor modules includes pre-amplifiers.

12. The force sensor system according to claim 1, wherein said amplifier module includes at least one piezo-element.

* * * * *